Patented Aug. 31, 1943

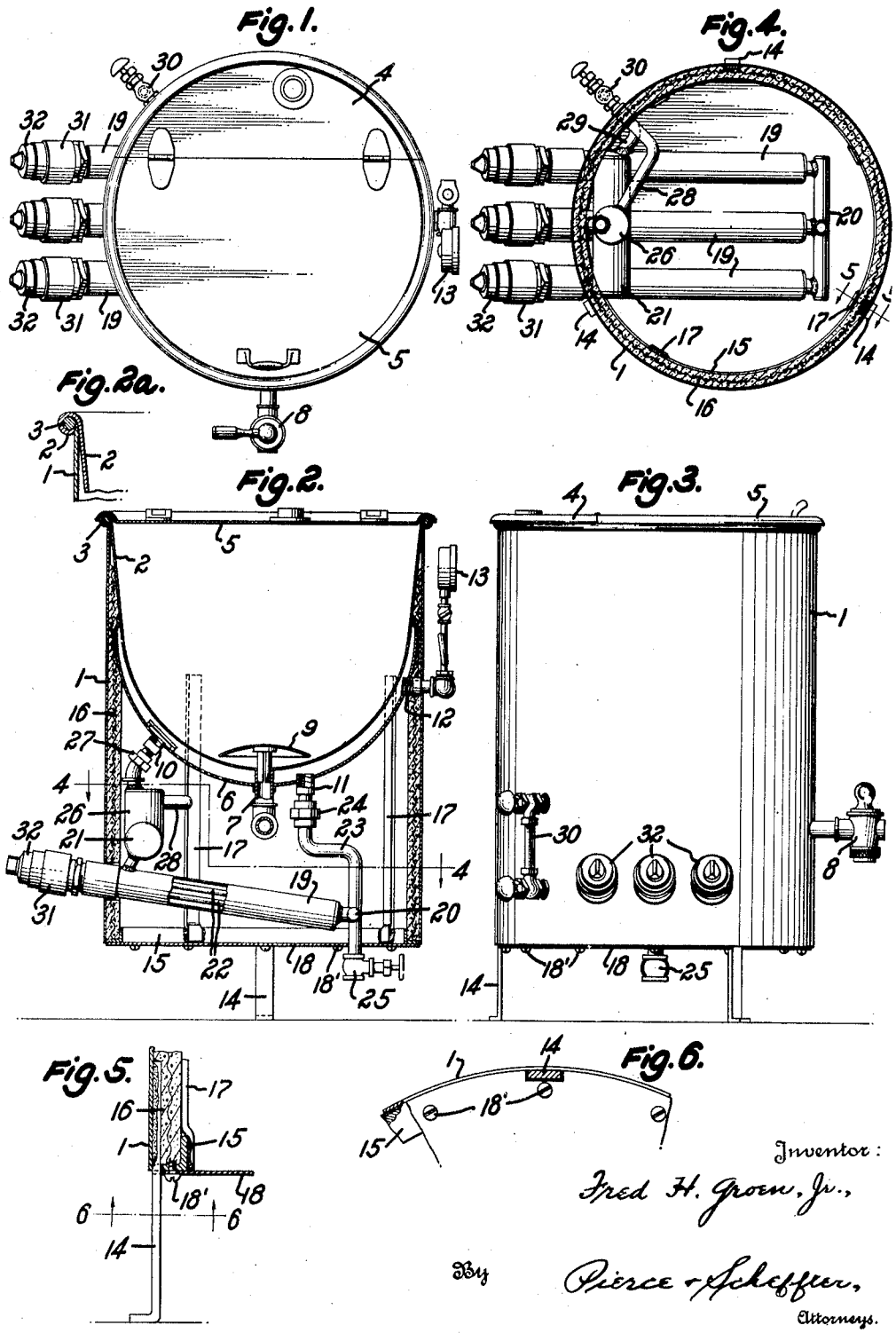

2,328,210

UNITED STATES PATENT OFFICE 2,328,210

KETTLE

Fred H. Groen, Jr., Chicago, Ill., assignor to Groen Mfg. Co., Chicago, Ill., a corporation of Illinois Application December 17, 1941, Serial No. 423,377

6 Claims. (Cl. 219—43)

This invention relates to kettles and particularly to steam-jacketed kettles of the type employed in hospitals, restaurants and other fields where large groups of people are to be fed.

The general practice is to operate such kettles on pressure steam supplied from a boiler, and electrically-heated water-jacketed kettles have been employed where it was inconvenient or expensive to run steam pipes from the kettle position to a remote boiler. Such water-jacketed kettles have been of relatively large size, for a given kettle capacity, and therefore expensive to manufacture and to operate. This invention contemplates an electrically heated, steam-jacketed kettle that may be, except for the electrical heating system, substantially identical with the steam-jacketed kettles that are operated from a boiler.

An object of the invention is to provide an electrically heated, steam-jacketed kettle of economical design and construction that may be heated more rapidly and more economically than the prior electrically heated, water-jacketed kettles. An object is to provide a steam-jacketed kettle that is thermally insulated to conserve heat energy. Another object is to provide an electrically heated steam generating unit that may be located within the insulated casing of a steam-jacketed kettle as an alternative to a steam supply through pipe connections from a boiler.

These and other objects and advantages of the invention will be apparent from the following specification when taken with the accompanying drawing in which:

Fig. 1 is a plan view of a steam-jacketed kettle embodying the invention;

Fig. 2 is a vertical sectional view of the same;

Fig. 2a is a fragmentary section, on an enlarged scale, through the edge of the kettle and the top of the casing;

Fig. 3 is a side elevation of the kettle as seen from the left side of Figs. 1 and 2;

Fig. 4 is a transverse section as viewed on the section indicated by line 4—4 of Fig. 2;

Fig. 5 is a fragmentary vertical section through the lower end of the casing as seen on line 5—5 of Fig. 4; and Fig. 6 is a fragmentary bottom view of the casing as seen from the plane indicated by line 6—6 of Fig. 5.

In the drawing, the reference numeral 1 identifies the cylindrical shell within which the kettle 2 is supported by projecting bead or flange 2 that is formed by rolling the upper edge of the kettle around an annular steel ring 3. The kettle is closed by a segment 4 that is welded to the kettle flange and a cover segment 5 that is hinged upon the fixed segment 4. A steam jacket of relatively small volume is formed beneath the hemispherical bottom of the kettle by a domed plate 6 that is welded at its upper edge to the kettle. The kettle outlet 7 extends through the steam jacket for connection to the drawoff valve 8, and the usually removable strainer 9 is fitted into the kettle outlet opening. A threaded steam inlet bushing 10 and a condensate outlet bushing 11 are welded to the steam jacket at, respectively, an elevated point and a point adjacent the bottom thereof. A bushing 12 for the attachment of pressure gauge 13 is welded to the steam jacket near the upper edge thereof.

The cylindrical shell 1 is supported by legs 14, and ring 15 of angle cross-section is welded to the lower edge of the shell to provide an annular recess within and at the lower end of the shell 1. A sheet or "blanket" of fibrous heat insulating material 16 is fitted within an annular recess and held against the shell 1 by a number of narrow metal straps 17 that are "tack welded" to the ring flange 15. The insulating blanket is readily compressible but is self-supporting as it is formed on a wire mesh reinforcement, and the upper ends of the straps 17 are "floating" but retained in place by engagement with the outer surface of the steam dome 6. The casing of the steam kettle is completed by a removable bottom plate 18 that is secured to the ring 15 by screws 18'.

The steam generating unit comprises a plurality of parallel tubes 19 that are inclined to the horizontal, connected at their lower ends to a water manifold 20 and at their upper ends to a steam chamber 21, and electrical "immersion" heaters 22 of known or desired design that extend into the tubes 19 from their upper ends. A water return pipe 23 is welded to the water manifold 20 and connected to the condensate outlet bushing 11 of the steam jacket by a compression coupling 24, and a drawoff valve 25 is also connected to the water manifold. The dome 26 of the steam chamber 21 is connected to the inlet bushing 10 of the steam jacket by a bent pipe fitting and a compression coupling 27. Pipe connections 28, 29 extend from the steam dome 21 and one of the tubes 19, respectively, for connection to the water level gauge 30.

The immersion heaters are self-contained units that include mounting heads 31 for securing the heaters to the tubes 19, and switches 32 that may be on-off switches or step switches for regulating current flow to the heater elements 22 from the external circuit, not shown, that is led into the immersion heater in the conventional manner by a line connection into the mounting head 31.

The illustrated kettle is readily assembled by connecting the supporting legs 14 and bottom flange 15 to the shell 1, inserting the insulating blanket 16, "tacking" the straps 17 to the ring 15, and then inserting the kettle into the upper end of the shell 1. Drawoff valve 8 is connected to the kettle and the steam generating unit, but with the electrical heaters removed, is brought into position and coupled to the steam jacket 6 by the compression couplings 24 and 27. The bottom plate 18 is then secured to the ring 15, the electrical heater units are mounted in the tubes 19, and the pressure gauge is attached. When the kettle is first set up, water is run into the steam generating unit through the water drawoff valve 25, the pressure gauge being temporarily removed to provide a vent for the escape of air during the filling operation. The steam jacket is sealed, and water need be added only at long intervals.

It is to be noted that the quantity of water required to submerge the immersion heaters 22, and these heaters must be under water to preclude a burn-out of the resistors, is only a fraction of the quantity of water that must be provided when the heaters are located in a water jacket beneath the kettle 2. In general, the volume of a water jacket for receiving immersion electrical heaters will be from 25 to 35 per cent of the volume of the kettle. In the electrically heated steam kettle of this invention, the quantity of water in the steam generating tubes 19 and associated elements may be only a small fraction of the kettle capacity. More specifically, a 40 gallon kettle must be provided with a water jacket of about 10 gallon capacity to insure a water layer over electrical immersion heaters while a steam-jacketed kettle of the novel design can be operated from a steam generator having a water volume of about 2½ gallons. The speed and the efficiency of heat transfer from the electrical heaters to the kettle increase with a decrease in the volume of water and, in general, for a given kettle capacity and the same electrical power input, the contents of a steam jacketed kettle of this invention will be heated to a desired temperature in one-half or less than one-half the time required in the case of a water-jacketed kettle heated by immersion heaters.

The kettle 2, steam jacket 6 and casing shell 1 are preferably formed of a corrosion-resistant metal, such as stainless steel, copper or aluminum, but the invention is not limited to the use of any particular metal or type of metal. The number of steam-generating tubes 19 may be varied in accordance with the capacity of the kettle and the power output of the heater units.

I claim:

1. In a steam heated kettle, the combination with a kettle, and a steam jacket secured thereto and having a steam inlet and a condensate outlet, of a steam generating unit comprising a plurality of inclined tubes connected at their lower ends to a water manifold and at their upper ends to a steam chamber, an electrical heater within each of said tubes, a connection from the steam chamber to the steam inlet of said steam jacket, and a connection from the water manifold to the condensate outlet of said steam jacket.

2. In a steam heated kettle, the invention as recited in claim 1, in combination with a water level gauge connected to said steam chamber and to the upper end of one of said tubes.

3. In a steam heated kettle, a cylindrical shell, a kettle telescoped within and resting upon said shell, a flange secured to and within the lower end of said shell, a self-supporting layer of insulating material within said shell, straps secured at their lower ends to said shell to retain said insulating lining against said shell, the upper ends of said straps being unattached and positioned by engagement with said kettle.

4. In a steam heated kettle, the invention as recited in claim 3, in combination with an electrically energized steam generator within said cylindrical shell for heating said kettle.

5. In a steam heated kettle, the invention as recited in claim 3, in combination with an electrically energized steam generator within said cylindrical shell for heating said kettle, and a removable closure for the bottom of said shell.

6. In a steam heated kettle, a steam generating unit comprising a plurality of inclined tubes, a water manifold connected to the lower ends of said tubes, a steam chamber connected to the upper ends of said tubes, electrical heater units within each of said tubes, and water and steam connections extending from said water manifold and said steam chamber respectively.

FRED H. GROEN, Jr.